(12) United States Patent
Einoegg et al.

(10) Patent No.: US 11,605,853 B2
(45) Date of Patent: Mar. 14, 2023

(54) ENERGY STORE HAVING A COOLING DEVICE AND MOTOR VEHICLE HAVING AN ENERGY STORE

(71) Applicant: Bayerische Motoren Werke Aktiengesellschaft, Munich (DE)

(72) Inventors: Florian Einoegg, Biessenhofen (DE); Michael Huber, Munich (DE); Andreas Ring, Olching (DE); Matthias Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 480 days.

(21) Appl. No.: 16/567,851

(22) Filed: Sep. 11, 2019

(65) Prior Publication Data

US 2020/0006826 A1 Jan. 2, 2020

Related U.S. Application Data

(63) Continuation of application No. PCT/EP2018/055226, filed on Mar. 2, 2018.

(30) Foreign Application Priority Data

Mar. 14, 2017 (DE) ..................... 10 2017 204 194.3

(51) Int. Cl.
*H01M 10/6556* (2014.01)
*H01M 10/613* (2014.01)
(Continued)

(52) U.S. Cl.
CPC ......... *H01M 10/6556* (2015.04); *B60L 50/66* (2019.02); *B60L 58/26* (2019.02);
(Continued)

(58) Field of Classification Search
CPC .......... B60L 50/66; B60L 58/26; B60L 58/24; H01M 10/6556; H01M 10/613;
(Continued)

(56) References Cited

U.S. PATENT DOCUMENTS

| 9,362,598 | B2 | 6/2016 | Srinivasan et al. |
| 2008/0299446 | A1* | 12/2008 | Kelly ................ H01M 10/6556 429/88 |

(Continued)

FOREIGN PATENT DOCUMENTS

| CN | 102037581 A | 4/2011 |
| CN | 105390771 A | 3/2016 |

(Continued)

OTHER PUBLICATIONS

English Translation of DE102010032900.*

(Continued)

*Primary Examiner* — Kiran Quraishi Akhtar
(74) *Attorney, Agent, or Firm* — Crowell & Moring LLP

(57) ABSTRACT

An energy store includes a plurality of electrical energy storage modules which are arranged in neighboring rows and a plurality of separate cooling elements each of which is in contact with at least one surface of an associated one of the plurality of electrical energy storage modules. A coolant or a refrigerant is flowable through the plurality of separate cooling elements where the plurality of separate cooling elements have a respective intake and a discharge. A coolant channel is disposed between the neighboring rows. The respective intake and the discharge of the plurality of separate cooling elements are each connected to the coolant channel via a respective coolant line and the coolant channel has a feed and a return which are adjacent to a hollow space that is disposed between the feed and the return.

9 Claims, 1 Drawing Sheet

(51) Int. Cl.
  *H01M 10/625* (2014.01)
  *H01M 10/647* (2014.01)
  *H01M 10/6554* (2014.01)
  *B60L 50/60* (2019.01)
  *B60L 58/26* (2019.01)
  *H01M 50/20* (2021.01)

(52) U.S. Cl.
  CPC ....... *H01M 10/613* (2015.04); *H01M 10/625* (2015.04); *H01M 10/647* (2015.04); *H01M 10/6554* (2015.04); *H01M 50/20* (2021.01); *H01M 2220/20* (2013.01)

(58) Field of Classification Search
  CPC ............. H01M 10/625; H01M 10/647; H01M 10/6567; H01M 50/20; H01M 2220/20; H01M 10/6565; H01M 10/651; H01M 10/617; H01M 10/652; H01M 10/6554; H01M 10/6557; Y02E 60/10; Y02T 10/70
  See application file for complete search history.

(56) References Cited

U.S. PATENT DOCUMENTS

| | | | |
|---|---|---|---|
| 2011/0129716 A1* | 6/2011 | Chung | B60L 50/64 429/120 |
| 2013/0011713 A1* | 1/2013 | Harada | H01M 10/613 429/120 |
| 2016/0056516 A1* | 2/2016 | Srinivasan | B60L 50/64 429/120 |
| 2018/0034119 A1 | 2/2018 | Siering et al. | |

FOREIGN PATENT DOCUMENTS

| | | | |
|---|---|---|---|
| DE | 10 2008 014 155 A1 | 9/2009 | |
| DE | 102010032900 | * 2/2012 | ............ H01M 10/50 |
| DE | 10 2015 113 622 A1 | 2/2016 | |
| DE | 10 2015 106 948 A1 | 11/2016 | |
| DE | 10 2016 209 378 A1 | 12/2016 | |
| DE | 10 2015 215 253 A1 | 2/2017 | |
| EP | 2 541 669 A1 | 1/2013 | |
| WO | WO 2017/021018 A1 | 2/2017 | |

OTHER PUBLICATIONS

PCT/EP2018/055226, International Search Report dated Jun. 7, 2018 (Two (2) pages).

German Search Report issued in German counterpart application No. 10 2017 204 194.3 dated Dec. 19, 2017 (Seven (7) pages).

Chinese Office Action issued in Chinese application No. 201880013268.5 dated Jan. 11, 2022, with English translation (Sixteen (16) pages).

* cited by examiner

ENERGY STORE HAVING A COOLING DEVICE AND MOTOR VEHICLE HAVING AN ENERGY STORE

CROSS REFERENCE TO RELATED APPLICATIONS

This application is a continuation of PCT International Application No. PCT/EP2018/055226, filed Mar. 2, 2018, which claims priority under 35 U.S.C. § 119 from German Patent Application No. 10 2017 204 194.3, filed Mar. 14, 2017, the entire disclosures of which are herein expressly incorporated by reference.

BACKGROUND AND SUMMARY OF THE INVENTION

The invention relates to an energy store having a cooling device and to a motor vehicle having such a cooling device.

In the interests of securing the range, the service life and the retrievable capacity of electric and hybrid vehicles, the specific thermal management of batteries/battery cells/battery cell modules is required. Active and passive cooling systems are employed for this purpose.

From DE 102015215253 A1, for example, an energy store having a cooling device is known, wherein a plurality of cooling modules, which are assigned to respective energy storage modules, branch off from a common coolant channel. The coolant channel can incorporate both a feed and a return in its cross-section.

According to one exemplary embodiment of the invention, an energy store having a cooling device is provided, specifically for motor vehicles, comprising a plurality of electrical energy storage modules, which are electrically connected in series or in parallel and which are arranged in neighboring rows; a plurality of separate cooling elements, each of which is in contact with at least one surface of an associated energy storage module, for receiving heat from the energy storage modules, through which coolant or refrigerant can flow, and which have a respective intake and discharge; a coolant channel, which is arranged between the neighboring rows of energy storage modules, wherein the intake and discharge of the cooling elements are each connected to the coolant channel via a coolant line, and wherein the coolant channel incorporates a feed and a return in its cross-section, which are adjacent to a hollow space constituted between the feed and the return. By the interposition of a hollow space, any transmission of thermal energy between the cold feed and the warm/hot return is reduced, such that an improved cooling action of the energy storage modules can be achieved.

According to a further exemplary embodiment of the invention, the feed is subdivided by a structural wall which incorporates openings, and the return is subdivided by a structural wall which incorporates openings, and which respectively extends in a longitudinal direction of the coolant channel. The pressurized coolant or refrigerant exerts pressure on the interior walls of the coolant channel. The dividing wall thus enhances the stability of the coolant channel.

According to a further exemplary embodiment of the invention, the coolant lines are flexible. Flexible coolant lines facilitate the insertion and withdrawal of the energy storage modules and the cooling elements. The insertion and withdrawal movement of the energy storage modules is thus dissociated from the connection of the coolant lines to the coolant channel.

According to a further exemplary embodiment of the invention, the coolant lines are attachable to the coolant channel by means of snap-fit plug connectors, which can be fitted without the use of tools. This enhances the capability of the energy store for series production, as the energy storage modules and the cooling elements can be fitted in a very rapid and simple manner.

According to a further exemplary embodiment of the invention, the energy store is configured such that the intakes and discharges, by way of cooling element nozzles, project from the cooling elements in a specific direction, and the coolant line for connection to the coolant channel is connectable to a coolant channel nozzle, wherein the coolant channel nozzle essentially projects from the coolant channel in the same direction as the cooling plate nozzle projects from the cooling plate. By means of the identical, or essentially identical orientation of the nozzles, the energy storage modules and/or the cooling elements can be lowered into their fitted position or raised from their fitted position with the coolant lines connected to the coolant channel, wherein the coolant line will follow this movement.

According to a further exemplary embodiment of the invention, the coolant channel has a rectangular cross-section. A rectangular cross-section of this type delivers a favorable combination of good fluid flow properties and limited spatial requirements. Specifically, this is provided by a height-to-width ratio of 4:1.

According to a further exemplary embodiment of the invention, the coolant line is comprised, at least in part, of a hose, a plastic pipe and/or a corrugated pipe.

The present invention further provides a motor vehicle having such an energy store.

A preferred exemplary embodiment of the present invention is described hereinafter, with reference to the attached drawings.

Other objects, advantages and novel features of the present invention will become apparent from the following detailed description of one or more preferred embodiments when considered in conjunction with the accompanying drawings.

DETAILED DESCRIPTION OF THE DRAWINGS

The energy store according to the invention is an energy store for the storage of electrical energy, and is preferably employed as a traction energy store for the delivery of drive energy in an entirely electrically-powered motor vehicle or a hybrid vehicle. The motor vehicle is preferably a private car, but can also be another type of motor vehicle.

The energy store comprises a plurality of energy storage modules 1, which are electrically connected in series or in parallel. Each of these energy storage modules 1 comprises a plurality of storage cells 2, which are arranged directly side by side and are electrically connected in series or in parallel (only some are identified by a reference number). Preferably, the energy store has an output voltage greater than 45 volts, although this output voltage can also be greater than 250 volts.

The energy storage modules 1 are arranged in the energy store, such that the energy storage modules 1 are arranged in rows or grouped in rows. Preferably, a longitudinal direction of an energy storage module 1 is oriented perpendicularly to the longitudinal direction or stacking direction of a row. Within a row, the energy storage modules 1 are arranged directly side by side.

Figure 1:
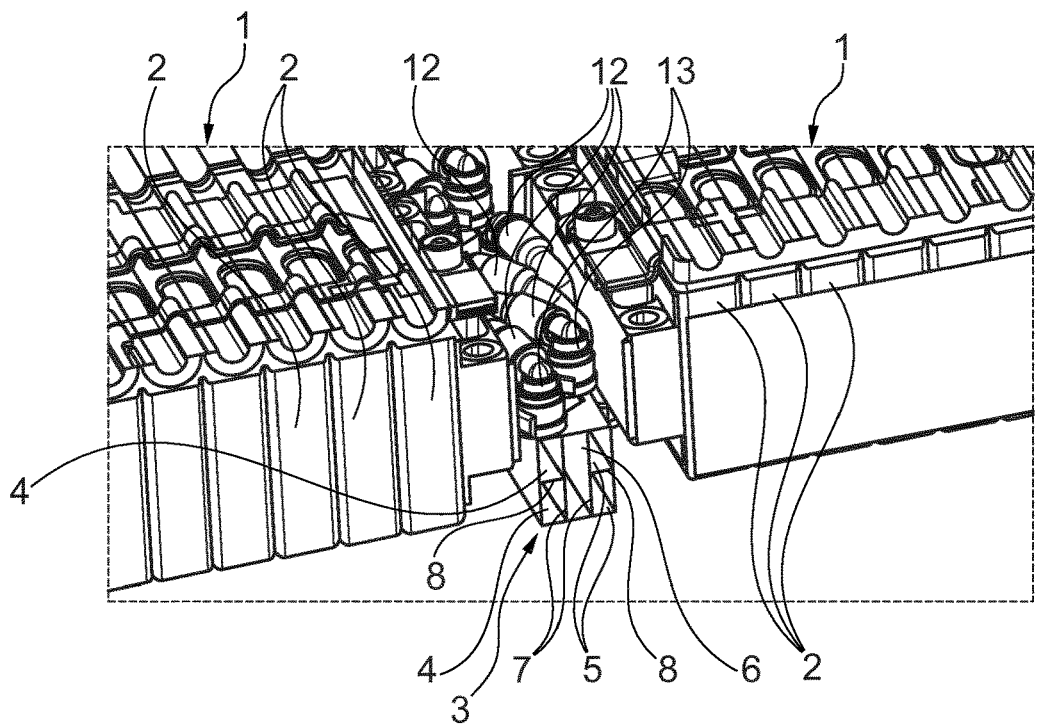
FIG. 1 shows a three-dimensional representation of energy storage modules in the energy store according to the invention, with a coolant channel running between the latter.
Figure 2:
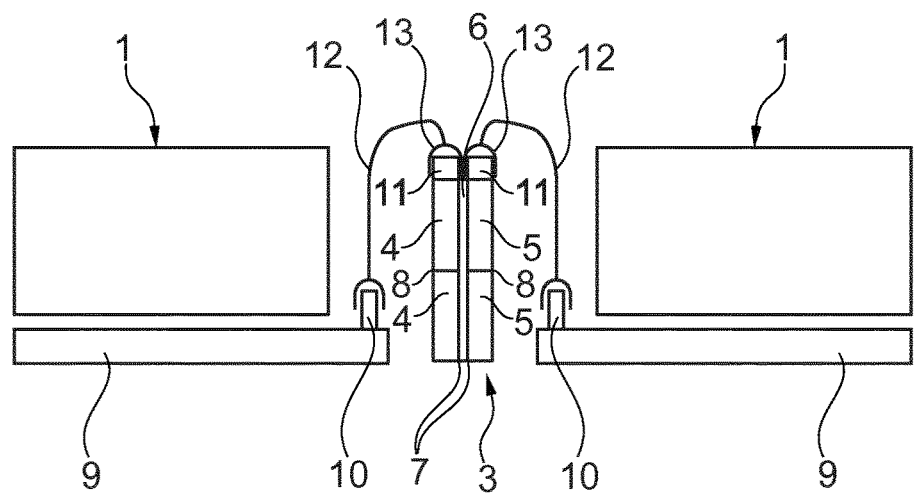
FIG. 2 shows a schematic representation of the connection of the cooling elements to the coolant channel.

Between adjoining rows of energy storage modules 1, a coolant channel 3 is provided, which constitutes a line section of a coolant or refrigerant circuit, in which a coolant or a refrigerant circulates. Preferably, the energy store comprises two rows of energy storage modules 1, between which a coolant channel 3 is arranged. However, it is also possible for more than two rows to be present. For example, the energy storage modules 1 can be arranged in three rows, such that a total of two coolant channels 3 are provided, namely, one between each of the adjoining rows. The coolant channel 3 is configured as a one-piece, subdivided channel. Preferably, the coolant channel 3 is configured lineally and, in cross-section, assumes a rectangular outer contour. The coolant channel 3 comprises a feed 4 and a return 5. Both the feed 4 and the return 5 are adjacent to a hollow space 6, and are respectively separated from the latter in a fluid-tight manner by continuously closed partitions 7. Preferably, the coolant channel 3 is subdivided into at least three chambers, which extend in the longitudinal direction of the coolant channel 3. The partitions 7 which constitute the at least three chambers are preferably flat. A plane which extends centrally between the adjoining rows, for explanatory purposes, is described as the mid-plane. The partitions 7 which constitute the at least three chambers are preferably parallel to the mid-plane, and extend over the full extent of the coolant channel 3, parallel to the plane, as can be seen from FIG. 1. By means of the hollow space 6, the feed 4 is spaced from the return 5 over the full longitudinal direction of the coolant channel 3, and over the full dimension thereof parallel to the mid-plane, specifically with a constant clearance. Although, in service, the hollow space 6 preferably contains air, it is also possible, in the interests of improved thermal insulation, for a vacuum to be provided in the hollow space 6. The feed 4 and the return 5 can be subdivided by one or more structural walls 8, which incorporate openings. These structural walls 8 are oriented in the longitudinal direction, perpendicularly to the mid-plane. These structural walls 8 improve the stability of the coolant channel 3. The coolant channel 3 is comprised, for example, of aluminum, but can also be comprised of a plastic. Specifically, the coolant channel 3 can be configured as an extruded section.

For the cooling of each energy storage module 1, cooling elements 9 are provided. In the case represented, the cooling elements 9 are configured as cooling plates, the hollow interior of which can accommodate a flux of coolant or refrigerant. For example, in the interior of the cooling plates 9, a meander-shaped channel for the coolant or refrigerant is configured. However, the cooling elements 9 can also be constituted as a grid or as parallel-oriented tubes/flat tubes, through which a coolant or refrigerant can flow. Preferably, the cooling elements 9 are respectively arranged on one side of the energy storage modules 1, preferably on the underside in relation to the site of installation in the vehicle. However, the cooling elements 9 can also be arranged on more than one side of the energy storage modules 1. Preferably, a separate cooling element 9 is assigned to each energy storage module 1, although it is also possible for a plurality of energy storage modules 1 to be assigned to one cooling element 9. The cooling elements 9 each comprise two cooling element nozzles 10, which project from the cooling element 9, one of which constitutes an intake, via which the coolant or refrigerant can be introduced into the interior of the cooling element 9, and the other of which constitutes a discharge, via which the coolant or refrigerant can be expelled from the interior of the cooling element 9. The cooling element nozzles 10 are soldered or welded onto the cooling element 9. The cooling element nozzles 10 project from the cooling element 9 in a specific direction.

On the coolant channel 3, for each of the cooling elements 9 which is to be connected to the cooling channel 3, two coolant channel nozzles 11 are provided, which preferably project from the coolant channel 3 in the same direction as the cooling element nozzles 10 from the cooling element 9. This direction is preferably an upward direction, in relation to the site of installation in the vehicle. One of these two coolant channel nozzles 11 is connected to the feed 4, and the other to the return 5.

Coolant lines 12 respectively connect one coolant channel nozzle 11, which is connected to the feed, with a cooling element nozzle 10 which functions as an intake. Further coolant lines 12 respectively connect one coolant channel nozzle 11, which is connected to the return, with a cooling element nozzle 10 which functions as a discharge. The ends of the coolant lines 12 are provided with plug connectors 13, which are connectable to the coolant channel nozzles 11 and the cooling element nozzles 10 without the use of tools, preferably in a snap-fit arrangement. However, the cooling element nozzles 10 and/or the coolant channel nozzles 11 can also, for example, be provided with a thread (preferably an external thread), onto which a terminal end of the coolant lines 12 which incorporates a thread can be screwed, or onto which a double connector can be screwed, which connects the ends of the coolant lines 12 to the nozzles. To this end, corresponding seals including, for example, O-ring seals, can be employed.

The feed 4 of the coolant channel 3 is thus connected to the return 5, not directly, but via the cooling element 9, i.e., the coolant or refrigerant flows into the cooling element 9 via the feed 4, and from thence to the return 5. The longitudinal ends of the coolant channel 3 are thus sealed in a fluid-tight manner wherein, for the incorporation of the coolant channel 3 into the coolant or refrigerant circuit, the feed 4 is provided with an infeed line and the return 5 with a discharge line into the coolant or refrigerant circuit, which terminate at one of the longitudinal ends.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy store, comprising:
   a plurality of electrical energy storage modules which are electrically connected in series or in parallel and which are arranged in neighboring rows;
   a plurality of separate cooling elements each of which is in contact with at least one surface of an associated one of the plurality of electrical energy storage modules for receiving heat from the associated one of the plurality of electrical energy storage modules, wherein a coolant or a refrigerant is flowable through the plurality of separate cooling elements and wherein the plurality of separate cooling elements have a respective intake and a discharge; and a coolant channel which is disposed between the neighboring rows;

wherein the respective intake and the discharge of the plurality of separate cooling elements are each connected to the coolant channel via a respective coolant line; and wherein the coolant channel has a feed, a return, and a hollow space that is disposed between the feed and the return, wherein a first wall defining the feed faces a first one of the neighboring rows, wherein a first wall defining the return faces a second one of the neighboring rows, wherein the hollow space is disposed between the feed and the return between respective second walls that define the feed and the return along an entire extent of the respective second walls, and wherein the respective first walls and second walls are parallel to each other.

2. The energy store according to claim 1, wherein the feed is subdivided by a first structural wall which has first openings, wherein the return is subdivided by a second structural wall which has second openings, and wherein the first and second structural walls extend in a longitudinal direction of the coolant channel.

3. The energy store according to claim 1, wherein the respective coolant lines are flexible.

4. The energy store according to claim 1, wherein the respective coolant lines are attachable to the coolant channel by a respective snap-fit plug connector which is attachable without a use of a tool.

5. The energy store according to claim 1, wherein the plurality of separate cooling elements each have respective cooling element nozzles that project from the plurality of separate cooling elements in a direction and wherein the coolant channel has a plurality of coolant channel nozzles that project from the coolant channel in the direction.

6. The energy store according to claim 1, wherein the coolant channel has a rectangular cross-section.

7. The energy store according to claim 6, wherein the rectangular cross-section has a height-to-width ratio of 4:1.

8. The energy store according to claim 1, wherein the respective coolant lines are comprised, at least in part, of a hose, a plastic pipe and/or a corrugated pipe.

9. A motor vehicle comprising the energy store according to claim 1.

* * * * *